United States Patent
Yu et al.

(10) Patent No.: US 11,696,360 B2
(45) Date of Patent: Jul. 4, 2023

(54) METHOD AND USER EQUIPMENT FOR CONTROLLING DISCONTINUOUS RECEPTION BEHAVIOR ON MULTIPLE RADIO INTERFACES

(71) Applicant: FG Innovation Company Limited, Tuen Mun (HK)

(72) Inventors: Chia-Hao Yu, Taipei (TW); Yung-Lan Tseng, Taipei (TW); Hsin-Hsi Tsai, Taipei (TW)

(73) Assignee: FG Innovation Company Limited, Tuen Mun (HK)

( * ) Notice: Subject to any disclaimer, the term of this patent is extended or adjusted under 35 U.S.C. 154(b) by 0 days.

(21) Appl. No.: 17/369,308

(22) Filed: Jul. 7, 2021

(65) Prior Publication Data

US 2022/0022280 A1    Jan. 20, 2022

Related U.S. Application Data

(60) Provisional application No. 63/052,904, filed on Jul. 16, 2020.

(51) Int. Cl.
| | |
|---|---|
| *H04W 4/00* | (2018.01) |
| *H04W 76/28* | (2018.01) |
| *H04L 1/1812* | (2023.01) |
| *H04W 92/18* | (2009.01) |

(52) U.S. Cl.
CPC .......... *H04W 76/28* (2018.02); *H04L 1/1819* (2013.01); *H04W 92/18* (2013.01)

(58) Field of Classification Search
USPC .................................................. 370/329, 330
See application file for complete search history.

(56) References Cited

U.S. PATENT DOCUMENTS

| | | | | |
|---|---|---|---|---|
| 11,252,753 | B2* | 2/2022 | Chen | ............... H04L 1/1822 |
| 2019/0053322 | A1 | 2/2019 | Wu et al. | |
| 2020/0068652 | A1* | 2/2020 | Xu | ............... H04W 80/08 |

(Continued)

FOREIGN PATENT DOCUMENTS

| | | |
|---|---|---|
| CA | 3014152 A1 | 8/2017 |
| CA | 3038086 A1 | 3/2018 |

(Continued)

OTHER PUBLICATIONS

Huawei, Hisilicon, "Discussion on remaining MAC Open issues for 5G V2X with NR SL", 3GPP TSG-RAN WG2 Meeting #110 electronic Jun. 1-12, 2020, R2-2005492.

(Continued)

*Primary Examiner* — Chuong T Ho
(74) *Attorney, Agent, or Firm* — ScienBiziP, P.C.

(57) ABSTRACT

A method and a user equipment (UE) for controlling Discontinuous Reception (DRX) behavior on multiple radio interfaces are provided. The method includes receiving, from a Base Station (BS), a first set of timers configured for controlling a first DRX behavior of the UE on a Uu interface to the BS; performing control channel monitoring according to the first set of timers; identifying that a Sidelink (SL) activity occurs on an SL interface that is a PC5 interface, the SL activity associated with one or more SL destinations on the PC5 interface; and starting or restarting at least one of the first set of timers in response to identifying the SL activity.

16 Claims, 5 Drawing Sheets

(56) References Cited

U.S. PATENT DOCUMENTS

| | | | | |
|---|---|---|---|---|
| 2020/0314819 | A1* | 10/2020 | Loehr | H04W 4/40 |
| 2020/0344722 | A1* | 10/2020 | He | H04W 72/0446 |
| 2021/0091912 | A1* | 3/2021 | Tang | H04W 72/0453 |
| 2021/0105857 | A1* | 4/2021 | He | H04W 80/02 |
| 2021/0227480 | A1* | 7/2021 | Sridharan | H04W 56/002 |
| 2021/0227620 | A1* | 7/2021 | Pan | H04L 1/1819 |
| 2021/0227621 | A1* | 7/2021 | Pan | H04W 72/0446 |
| 2021/0227622 | A1* | 7/2021 | Kung | H04W 76/28 |
| 2021/0251037 | A1* | 8/2021 | Akkarakaran | H04W 72/14 |
| 2021/0259042 | A1* | 8/2021 | Ding | H04W 72/1263 |
| 2021/0306948 | A1* | 9/2021 | Ding | H04L 1/1812 |
| 2021/0345296 | A1* | 11/2021 | Yang | H04W 72/0493 |
| 2021/0400762 | A1* | 12/2021 | Jeong | H04W 76/28 |
| 2022/0124765 | A1* | 4/2022 | Li | H04W 72/042 |
| 2022/0150730 | A1* | 5/2022 | Freda | H04L 1/188 |
| 2022/0217513 | A1* | 7/2022 | Back | H04W 4/021 |
| 2023/0014303 | A1* | 1/2023 | Di Girolamo | H04W 76/28 |

FOREIGN PATENT DOCUMENTS

| | | |
|---|---|---|
| CN | 105340341 A | 2/2016 |
| CN | 108377177 A | 8/2018 |
| CN | 109155709 A | 1/2019 |
| CN | 109792364 A | 5/2019 |
| CN | 109952807 A | 6/2019 |
| CN | 110089061 A | 8/2019 |
| CN | 111263451 A | 6/2020 |
| EP | 3310121 A1 | 4/2018 |
| EP | 3402288 A1 | 11/2018 |
| WO | 2015008967 A1 | 1/2015 |
| WO | 2018067400 A1 | 4/2018 |
| WO | 2018174456 A1 | 9/2018 |
| WO | 2019033017 A1 | 2/2019 |
| WO | 2020006366 A1 | 1/2020 |

OTHER PUBLICATIONS

ETSI MCC, "Report of 3GPP TSG RAN2#101bis meeting, Sanya, China", 3GPP TSG-RAN WG2 meeting #102 Busan, Korea, May 21-25, 2018, R2-1806601.

3GPP tsg_ran\tsg_ran, "RP_2019", Apr. 7, 2020.

G. Pocovi et al., "On the Suitability of LTE Air Interface for Reliable Low-Latency Applications", «2019 IEEE Wireless Communications and Networking Conference (WCNC)», Oct. 31, 2019.

S. Ryoo, J. Jung and R. Ahn, "Energy efficiency enhancement with RRC connection control for 5G new RAT", «2018 IEEE Wireless Communications and Networking Conference (WCNC)», Jun. 11, 2018.

Yuchen Chen, Guizhong Liu and Xin Chen, "Playout buffer and DRX aware scheduling scheme for video streaming over 3GPP LTE system", «2014 IEEE International Conference on Multimedia and Expo Workshops (ICMEW)», Sep. 8, 2014.

3rd Generation Partnership Project; Technical Specification Group Radio Access Network; NR; Physical layer procedures for control (Release 16); 3GPP TS 38.213 V16.1.0 (Mar. 2020).

3rd Generation Partnership Project; Technical Specification Group Radio Access Network; NR; Physical layer procedures for data (Release 16); 3GPP TS 38.214 V16.1.0 (Mar. 2020).

3rd Generation Partnership Project; Technical Specification Group Radio Access Network; NR; Medium Access Control (MAC) protocol specification (Release 16); 3GPP TS 38.321 V16.1.0 (Jul. 2020).

3rd Generation Partnership Project; Technical Specification Group Radio Access Network; NR; Medium Access Control (MAC) protocol specification (Release 16); 3GPP TS 38.321 V16.0.0 (Mar. 2020).

3rd Generation Partnership Project; Technical Specification Group Radio Access Network; NR; Radio Resource Control (RRC) protocol specification (Release 16); 3GPP TS 38.331 V16.0.0 (Mar. 2020).

* cited by examiner

METHOD AND USER EQUIPMENT FOR CONTROLLING DISCONTINUOUS RECEPTION BEHAVIOR ON MULTIPLE RADIO INTERFACES

CROSS-REFERENCE TO RELATED APPLICATION(S)

The present application claims the benefit of and priority to provisional U.S. Patent Application Ser. No. 63/052,904 (hereafter referred to as "the '904 provisional"), filed on Jul. 16, 2020, entitled "INTRA-UE SIDELINK DISCONTINUOUS TRANSMISSION AND RECEPTION OPERATION." The contents of the '904 provisional are fully incorporated herein by reference for all purposes.

FIELD

The present disclosure generally relates to wireless communication, and more particularly, to a method and a user equipment (UE) for controlling Discontinuous Reception (DRX) behavior on multiple radio interfaces.

BACKGROUND

With the tremendous growth in the number of connected devices and the rapid increase in user/network traffic volume, various efforts have been made to improve different aspects of wireless communication for the next-generation wireless communication system, such as the fifth-generation (5G) New Radio (NR), by improving data rate, latency, reliability, and mobility.

The 5G NR system is designed to provide flexibility and configurability to optimize the network services and types, accommodating various use cases such as enhanced Mobile Broadband (eMBB), massive Machine-Type Communication (mMTC), and Ultra-Reliable and Low-Latency Communication (URLLC).

However, as the demand for radio access continues to increase, there is a need for further improvements in wireless communication for the next-generation wireless communication system.

SUMMARY

The present disclosure is directed to a method and a UE for controlling DRX behavior on multiple radio interfaces.

According to an aspect of the present disclosure, the method performed by a UE for controlling DRX behavior on multiple radio interfaces is provided. The method includes receiving, from a Base Station (BS), a first set of timers configured for controlling a first DRX behavior of the UE on a Uu interface to the BS; performing control channel monitoring according to the first set of timers; identifying that a Sidelink (SL) activity occurs on an SL interface that is a PC5 interface, the SL activity associated with one or more SL destinations on the PC5 interface; and starting or restarting at least one of the first set of timers in response to identifying the SL activity.

According to another aspect of the present disclosure, a UE for controlling DRX behavior on multiple radio interfaces is provided. The UE includes transceiver circuitry and processing circuitry coupled to the transceiver circuitry. The processing circuitry is configured to use the transceiver circuitry to receive, from a BS, a first set of timers configured for controlling a first DRX behavior of the UE on a Uu interface to the BS; control the transceiver circuitry to perform control channel monitoring according to the first set of timers; identify that an SL activity occurs on an SL interface that is a PC5 interface, the SL activity associated with one or more SL destinations on the PC5 interface; and start or restart at least one of the first set of timers in response to identifying the SL activity.

BRIEF DESCRIPTION OF THE DRAWINGS

Aspects of the example disclosure are best understood from the following detailed description when read with the accompanying figures. Various features are not drawn to scale. Dimensions of various features may be arbitrarily increased or reduced for clarity of discussion.

DETAILED DESCRIPTION

Figure 1:
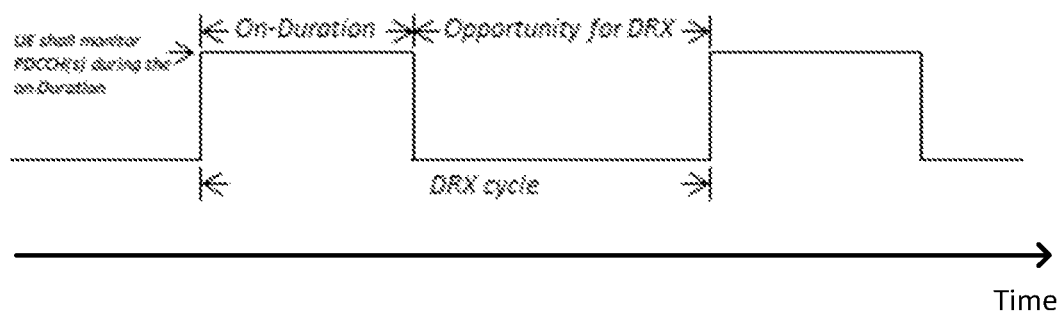
FIG. 1 illustrates an example of a DRX operation in which a DRX cycle is defined.

The following contains specific information related to implementations of the present disclosure. The drawings and their accompanying detailed description are merely directed to implementations. However, the present disclosure is not limited to these implementations. Other variations and implementations of the present disclosure will be obvious to those skilled in the art.

Unless noted otherwise, like or corresponding elements among the drawings may be indicated by like or corresponding reference numerals. Moreover, the drawings and illustrations in the present disclosure are generally not to scale and are not intended to correspond to actual relative dimensions.

For the purpose of consistency and ease of understanding, like features may be identified (although, in some examples, not illustrated) by the same numerals in the drawings. However, the features in different implementations may differ in other respects and shall not be narrowly confined to what is illustrated in the drawings.

The phrases "in one implementation," or "in some implementations," may each refer to one or more of the same or different implementations. The term "coupled" is defined as connected whether directly or indirectly via intervening components and is not necessarily limited to physical connections. The term "comprising" means "including, but not necessarily limited to" and specifically indicates open-ended inclusion or membership in the disclosed combination, group, series or equivalent. The expression "at least one of A, B and C" or "at least one of the following: A, B and C" means "only A, or only B, or only C, or any combination of A, B and C."

The terms "system" and "network" may be used interchangeably. The term "and/or" is only an association relationship for disclosing associated objects and represents that three relationships may exist such that A and/or B may indicate that A exists alone, A and B exist at the same time, or B exists alone. "A and/or B and/or C" may represent that at least one of A, B, and C exists. The character "/" generally represents that the associated objects are in an "or" relationship.

For the purposes of explanation and non-limitation, specific details such as functional entities, techniques, protocols, standards, and the like, are set forth for providing an understanding of the disclosed technology. In other examples, detailed disclosures of well-known methods, technologies, systems, architectures, and the like are omitted so as not to obscure the present disclosure with unnecessary details.

Persons skilled in the art will immediately recognize that any disclosed network function(s) or algorithm(s) may be implemented by hardware, software or a combination of software and hardware. Disclosed functions may correspond to modules which may be software, hardware, firmware, or any combination thereof.

A software implementation may include computer-executable instructions stored on a computer-readable medium such as memory or other type of storage devices. One or more microprocessors or general-purpose computers with communication processing capability may be programmed with corresponding computer-executable instructions and perform the disclosed network function(s) or algorithm(s).

The microprocessors or general-purpose computers may include Applications Specific Integrated Circuitry (ASIC), programmable logic arrays, and/or using one or more Digital Signal Processors (DSPs). Although some of the disclosed implementations are oriented to software installed and executing on computer hardware, alternative implementations implemented as firmware or as hardware or as a combination of hardware and software are well within the scope of the present disclosure. The computer-readable medium may include, but is not limited to, Random Access Memory (RAM), Read-Only Memory (ROM), Erasable Programmable Read-Only Memory (EPROM), Electrically Erasable Programmable Read-Only Memory (EEPROM), flash memory, Compact Disc Read-Only Memory (CD-ROM), magnetic cassettes, magnetic tape, magnetic disk storage, or any other equivalent medium capable of storing computer-readable instructions.

A radio communication network architecture such as a Long-Term Evolution (LTE) system, an LTE-Advanced (LTE-A) system, an LTE-Advanced Pro system, or a 5G NR Radio Access Network (RAN) may typically include at least one base station (BS), at least one UE, and one or more optional network elements that provide connection within a network. The UE may communicate with the network such as a Core Network (CN), an Evolved Packet Core (EPC) network, an Evolved Universal Terrestrial RAN (E-UTRAN), a Next-Generation Core (NGC), a 5G Core (5GC), or an internet via a RAN established by one or more BSs.

A UE may include, but is not limited to, a mobile station, a mobile terminal or device, or a user communication radio terminal. The UE may be a portable radio equipment that includes, but is not limited to, a mobile phone, a tablet, a wearable device, a sensor, a vehicle, or a Personal Digital Assistant (PDA) with wireless communication capability. The UE may be configured to receive and transmit signals over an air interface to one or more cells in a RAN.

The BS may be configured to provide communication services according to at least a Radio Access Technology (RAT) such as Worldwide Interoperability for Microwave Access (WiMAX), Global System for Mobile communications (GSM) that is often referred to as 2G, GSM Enhanced Data rates for GSM Evolution (EDGE) RAN (GERAN), General Packet Radio Service (GPRS), Universal Mobile Telecommunication System (UNITS) that is often referred to as 3G based on basic Wideband-Code Division Multiple Access (W-CDMA), High-Speed Packet Access (HSPA), LTE, LTE-A, evolved/enhanced LTE (eLTE) that is LTE connected to 5GC, NR (often referred to as 5G), and/or LTE-A Pro. However, the scope of the present disclosure is not limited to these protocols.

The BS may include, but is not limited to, a node B (NB) in the UNITS, an evolved node B (eNB) in LTE or LTE-A, a radio network controller (RNC) in UMTS, a BS controller (BSC) in the GSM/GERAN, a next-generation eNB (ng-eNB) in an Evolved Universal Terrestrial Radio Access (E-UTRA) BS in connection with 5GC, a next-generation Node B (gNB) in the 5G-RAN (or in the 5G Access Network (5G-AN)), or any other apparatus capable of controlling radio communication and managing radio resources within a cell. The BS may serve one or more UEs via a radio interface.

The BS may provide radio coverage to a specific geographical area using a plurality of cells included in the RAN. The BS may support the operations of the cells. Each cell may be operable to provide services to at least one UE within its radio coverage.

Each cell (often referred to as a serving cell) may provide services to serve one or more UEs within its radio coverage such that each cell schedules the downlink (DL) and optionally uplink (UL) resources to at least one UE within its radio coverage for DL and optionally UL packet transmissions. The BS may communicate with one or more UEs in the radio communication system via the plurality of cells.

A cell may allocate Sidelink (SL) resources for supporting Proximity Service (ProSe), LTE SL services, and/or LTE/NR Vehicle-to-Everything (V2X) services. Each cell may have overlapped coverage areas with other cells.

UE-side power consumption is one of major design considerations for many wireless communication systems. The demand triggered various innovative techniques for achieving power saving gain in scenarios such as cellular communication and Vehicle-to-everything (V2X) communication. For example, Connected Mode Discontinuous Reception (C-DRX) mechanism has been applied in the LTE/NR Uu interface as one of enablers for UE-side power saving, where the Uu interface may refer to a radio interface that links UE and Terrestrial Radio Access Network (T-RAN). The entry point for a T-RAN may be a Base Station such as eNB/gNB. The Uu interface allows data transfer between a UE and a base station (e.g., a eNB/gNB). In the LTE Sidelink (SL) communication, partial sensing-based resource selection and random resource selection are introduced for reducing power consumption of e.g., pedestrian UEs. Unfortunately, for NR (V2X) SL communication, there is not any power saving mechanism being introduced so far.

NR Uu DRX Mechanism

In NR or LTE, a UE may be configured with a DRX functionality that controls the UE's Physical Downlink Control Channel (PDCCH) monitoring activity. When in a Radio Resource Control (RRC) CONNECTED state, the UE does not have to continuously monitor PDCCH when DRX is configured.

A DRX operation may be determined by the following factors (1) to (5):

(1) on-duration: duration that the UE waits for, after waking up, to receive PDCCHs. If the UE successfully decodes a PDCCH, the UE stays awake and (re)starts the inactivity-timer;

(2) inactivity-timer: duration that the UE waits to successfully decode a PDCCH, from the last successful decoding of a PDCCH, failing which it can go back to sleep. The UE shall restart the inactivity timer following a single successful decoding of a PDCCH for a first transmission only (i.e., not for retransmissions);

(3) RetransmissionTimer: duration until a (Hybrid Automatic Repeat reQuest (HARQ)) retransmission can be expected;

(4) DRX cycle: specifies the periodic repetition of the on-duration followed by a possible period of inactivity;

(5) active-time: total duration that the UE monitors PDCCH(s). This includes the "on-duration" of the DRX cycle, the time UE is performing continuous (PDCCH) reception while the inactivity-timer has not expired, and the time when the UE is performing continuous (PDCCH) reception while waiting for a retransmission opportunity. FIG. 1 illustrates an example of a DRX operation in which a DRX cycle is defined. As illustrated in FIG. 1, a DRX cycle may include an on-duration during which the UE shall monitor PDCCH(s). The remaining part of the DRX cycle is an opportunity for DRX, depending on the operations of the related timers.

An example UE behavior of the DRX operation is shown in Table 1.

TABLE 1

The Medium Access Control (MAC) entity may be configured by RRC with a DRX functionality that controls the UE's PDCCH monitoring activity for the MAC entity's Cell-Radio Network Temporary Identifier (C-RNTI), Configured Scheduling (CS)- Radio Network Temporary Identifier (RNTI) (CS-RNTI), Interruption-RNTI (INT-RNTI), Slot Format Indicator (SFI)-RNTI, SP-Channel State Information (CSI)-RNTI, Transmit Power Control (TPC)-Physical Uplink Control Channel (PUCCH)-RNTI, TPC-Physical Uplink Shared Channel (PUSCH)-RNTI, and TPC-Sounding Reference Signal (SRS)-RNTI. When using DRX operation, the MAC entity shall also monitor PDCCH according to requirements found in other clauses of this specification. When in RRC_CONNECTED, if DRX is configured, for all the activated Serving Cells, the MAC entity may monitor the PDCCH discontinuously using the DRX operation specified in this clause; otherwise the MAC entity shall monitor the PDCCH as specified in Technical Specification (TS) 38.213.
RRC controls DRX operation by configuring the following parameters:
- drx-onDurationTimer: the duration at the beginning of a DRX Cycle;
- drx-SlotOffset: the delay before starting the drx-onDurationTimer;
- drx-InactivityTimer: the duration after the PDCCH occasion in which a PDCCH indicates a new UL or DL transmission for the MAC entity;
- drx-RetransmissionTimerDL (per DL HARQ process except for the broadcast process): the maximum duration until a DL retransmission is received;
- drx-RetransmissionTimerUL (per UL HARQ process): the maximum duration until a grant for UL retransmission is received;
- drx-LongCycleStartOffset: the Long DRX cycle and drx-StartOffset which defines the subframe where the Long and Short DRX Cycle starts;
- drx-ShortCycle (optional): the Short DRX cycle;
- drx-ShortCycleTimer (optional): the duration the UE shall follow the Short DRX cycle;
- drx-HARQ-RTT-TimerDL (per DL HARQ process except for the broadcast process): the minimum duration before a DL assignment for HARQ retransmission is expected by the MAC entity;
- drx-HARQ-RTT-TimerUL (per UL HARQ process): the minimum duration before a UL HARQ retransmission grant is expected by the MAC entity.
When a DRX cycle is configured, the Active Time includes the time while:
- drx-onDurationTimer or drx-InactivityTimer or drx-RetransmissionTimerDL or drx-RetransmissionTimerUL or ra-ContentionResolutionTimer is running; or
- a Scheduling Request is sent on PUCCH and is pending; or
- a PDCCH indicating a new transmission addressed to the C-RNTI of the MAC entity has not been received after successful reception of a Random Access Response for the Random Access Preamble not selected by the MAC entity among the contention-based Random Access Preamble.
When DRX is configured, the MAC entity shall:
    1> if a MAC Packet Date Unit (PDU) is received in a configured downlink assignment:
      2> start the drx-HARQ-RTT-TimerDL for the corresponding HARQ process in the first symbol after the end of the corresponding transmission carrying the DL HARQ feedback;
      2> stop the drx-RetransmissionTimerDL for the corresponding HARQ process.
    1> if a MAC PDU is transmitted in a configured uplink grant:
      2> start the drx-HARQ-RTT-TimerUL for the corresponding HARQ process in the first symbol after the end of the first repetition of the corresponding PUSCH transmission;
      2> stop the drx-RetransmissionTimerUL for the corresponding HARQ process.
    1> if a drx-HARQ-RTT-TimerDL expires:
      2> if the data of the corresponding HARQ process was not successfully decoded:
        3> start the drx-RetransmissionTimerDL for the corresponding HARQ process in the first symbol after the expiry of drx-HARQ-RTT-TimerDL.
    1> if a drx-HARQ-RTT-TimerUL expires:
      2> start the drx-RetransmissionTimerUL for the corresponding HARQ process in the first symbol after the expiry of drx-HARQ-RTT-TimerUL.
    1> if a DRX Command MAC Control Element (CE) or a Long DRX Command MAC CE is received:
      2> stop drx-onDurationTimer;
      2> stop drx-InactivityTimer.

TABLE 1-continued

```
1> if drx-InactivityTimer expires or a DRX Command MAC CE is received:
  2> if the Short DRX cycle is configured:
      3> start or restart drx-ShortCycleTimer in the first symbol after the expiry of drx-
         InactivityTimer or in the first symbol after the end of DRX Command MAC CE
         reception;
      3> use the Short DRX Cycle.
  2> else:
      3> use the Long DRX cycle.
1> if drx-ShortCycleTimer expires:
  2> use the Long DRX cycle.
1> if a Long DRX Command MAC CE is received:
  2> stop drx-ShortCycleTimer;
  2> use the Long DRX cycle.
1> if the Short DRX Cycle is used, and [(System Frame Number (SFN) x 10) + subframe
     number] modulo (drx-ShortCycle) = (drx-StartOffset) modulo (drx-ShortCycle); or
1> if the Long DRX Cycle is used, and [(SFN x 10) + subframe number] modulo (drx-
     LongCycle) = drx-StartOffset;
  2> start drx-onDurationTimer after drx-SlotOffset from the beginning of the subframe.
1> if the MAC entity is in Active Time:
  2> monitor the PDCCH as specified in TS 38.213 [6];
  2> if the PDCCH indicates a DL transmission:
      3> start the drx-HARQ-RTT-TimerDL for the corresponding HARQ process in the first
         symbol after the end of the corresponding transmission carrying the DL HARQ
         feedback;
      3> stop the drx-RetransmissionTimerDL for the corresponding HARQ process.
  2> if the PDCCH indicates a UL transmission:
      3> start the drx-HARQ-RTT-TimerUL for the corresponding HARQ process in the first
         symbol after the end of the first repetition of the corresponding PUSCH transmission;
      3> stop the drx-RetransmissionTimerUL for the corresponding HARQ process.
  2> if the PDCCH indicates a new transmission (DL or UL):
      3> start or restart drx-InactivityTimer in the first symbol after the end of the PDCCH
         reception.
1> in current symbol n, if the MAC entity would not be in Active Time considering
     grants/assignments/DRX Command MAC CE/Long DRX Command MAC CE received
     and Scheduling Request sent until 4 ms prior to symbol n when evaluating all DRX
     Active Time conditions as specified in this clause:
  2> not transmit periodic SRS and semi-persistent SRS defined in TS 38.214 [7];
  2> not report CSI on PUCCH and semi-persistent CSI on PUSCH.
1> if CSI masking (csi-Mask) is setup by upper layers:
  2> in current symbol n, if drx-onDurationTimer would not be running considering
     grants/assignments/DRX Command MAC CE/Long DRX Command MAC CE received
     until 4 ms prior to symbol n when evaluating all DRX Active Time conditions as
     specified in this clause:
      3> not report CSI on PUCCH.
Regardless of whether the MAC entity is monitoring PDCCH or not, the MAC entity transmits
HARQ feedback, aperiodic CSI on PUSCH, and aperiodic SRS defined in TS 38.214 [7] when such
is expected.
The MAC entity needs not to monitor the PDCCH if it is not a complete PDCCH occasion (e.g.,
the Active Time starts or ends in the middle of a PDCCH occasion).
```

Regarding a DRX Commmand Medium Access Control (MAC) Control Element (CE), it may be identified by a MAC subheader with a specific Logical Channel Identifier (LCID), which may be pre-defined in the 3GPP technical specifications. The LCID for DRX MAC CE has a fixed size of zero bits.

Regarding Long DRX Command MAC CE, it may be identified by a MAC subheader with a specific LCID pre-defined in 3GPP technical specification. The LCID for DRX MAC CE has a fixed size of zero bits.

A DRX configuration may refer to an Information Element (1E) denoted as, e.g., DRX-Config, which may be used to configure one or more DRX related parameters. An example of the IE DRX-Config, which is represented by Abstract Syntax Notation One (ASN. 1), is shown in Table 2.

TABLE 2

```
ASN1START
-- TAG-DRX-CONFIG-START
DRX-Config ::=           SEQUENCE {
  drx-onDurationTimer         CHOICE {
```

TABLE 2-continued

```
    subMilliSeconds INTEGER (1..31),
    milliSeconds ENUMERATED {
       ms1, ms2, ms3, ms4, ms5, ms6, ms8, ms10, ms20, ms30,
ms40, ms50, ms60,
       ms80, ms100, ms200, ms300, ms400, ms500, ms600,
ms800, ms1000, ms1200,
       ms1600, spare8, spare7, spare6, spare5, spare4, spare3,
spare2, spare1 }
  },
  drx-InactivityTimer                ENUMERATED {
    ms0, ms1, ms2, ms3, ms4, ms5, ms6, ms8, ms10, ms20,
ms30, ms40, ms50, ms60, ms80,
       ms100, ms200, ms300, ms500, ms750, ms1280, ms1920,
ms2560, spare9, spare8,
       spare7, spare6, spare5, spare4, spare3, spare2, spare1},
  drx-HARQ-RTT-TimerDL                INTEGER (0..56),
  drx-HARQ-RTT-TimerUL                INTEGER (0..56),
  drx-RetransmissionTimerDL           ENUMERATED {
    sl0, sl1, sl2, sl4, sl6, sl8, sl16, sl24, sl33, sl40, sl64,
sl80, sl96, sl112, sl128,
       sl160, sl320, spare15, spare14, spare13, spare12, spare11,
spare10, spare9,
       spare8, spare7, spare6, spare5, spare4, spare3, spare2,
spare1},
  drx-RetransmissionTimerUL           ENUMERATED {
```

TABLE 2-continued

```
            sl0, sl1, sl2, sl4, sl6, sl8, sl16, sl24, sl33, sl40, sl64,
sl80, sl96, sl112, sl128,
            sl160, sl320, spare15, spare14, spare13, spare12, spare11,
spare10, spare9,
            spare8, spare7, spare6, spare5, spare4, spare3, spare2,
                spare1 },
    drx-LongCycleStartOffset            CHOICE {
        ms10                            INTEGER(0..9),
        ms20                            INTEGER(0..19),
        ms32                            INTEGER(0..31),
        ms40                            INTEGER(0..39),
        ms60                            INTEGER(0..59),
        ms64                            INTEGER(0..63),
        ms70                            INTEGER(0..69),
        ms80                            INTEGER(0..79),
        ms128                           INTEGER(0..127),
        ms160                           INTEGER(0..159),
        ms256                           INTEGER(0..255),
        ms320                           INTEGER(0..319),
        ms512                           INTEGER(0..511),
        ms640                           INTEGER(0..639),
        ms1024                          INTEGER(0..1023),
        ms1280                          INTEGER(0..1279),
```

TABLE 2-continued

```
        ms2048                          INTEGER(0..2047),
        ms2560                          INTEGER(0..2559),
        ms5120                          INTEGER(0..5119),
        ms10240                         INTEGER(0..10239)
    },
    shortDRX                        SEQUENCE {
        drx-ShortCycle                  ENUMERATED {
            ms2, ms3, ms4, ms5, ms6, ms7, ms8, ms10, ms14, ms16,
ms20, ms30, ms32,
            ms35, ms40, ms64, ms80, ms128, ms160, ms256, ms320,
ms512, ms640, spare9,
            spare8, spare7, spare6, spare5, spare4, spare3, spare2,
                spare1 },
        drx-ShortCycleTimer             INTEGER (1..16)
    }                                                   OPTIONAL, --
                                                        Need R
    drx-SlotOffset                  INTEGER (0..31)
}
-- TAG-DRX-CONFIG-STOP
-- ASN1STOP
``` where the definitions of the parameters described in Table 2 are shown in Table 3.

TABLE 3

DRX-Config field descriptions drx-HARQ-RTT-TimerDL

Value in number of symbols of the Bandwidth Part (BWP) where the transport block was received.

drx-HARQ-RTT-TimerUL

Value in number of symbols of the BWP where the transport block was transmitted.

drx-InactivityTimer

Value in multiple integers of 1 ms. ms0 corresponds to 0, ms1 corresponds to 1 ms, ms2 corresponds to 2 ms, and so on.

drx-LongCycleStartOffset drx-LongCycle in ms and drx-StartOffset in multiples of 1 ms. If drx-ShortCycle is configured, the value of drx-LongCycle shall be a multiple of the drx-ShortCycle value.

drx-onDurationTimer

Value in multiples of 1/32 ms (subMilliSeconds) or in ms (milliSecond). For the latter, value ms1 corresponds to 1 ms, value ms2 corresponds to 2 ms, and so on.

drx-RetransmissionTimerDL

Value in number of slot lengths of the BWP where the transport block was received, value sl0 corresponds to 0 slots, sl1 corresponds to 1 slot, sl2 corresponds to 2 slots, and so on.

drx-RetransmissionTimerUL

Value in number of slot lengths of the BWP where the transport block was transmitted. sl0 corresponds to 0 slots, sl1 corresponds to 1 slot, sl2 corresponds to 2 slots, and so on.

drx-ShortCycleTimer

Value in multiples of drx-ShortCycle. A value of 1 corresponds to drx-ShortCycle, a value of 2 corresponds to 2 * drx-ShortCycle and so on.

drx-ShortCycle

Value in ms. ms1 corresponds to 1 ms, ms2 corresponds to 2 ms, and so on.

drx-SlotOffset

Value in 1/32 ms. Value 0 corresponds to 0 ms, value 1 corresponds to 1/32 ms, value 2 corresponds to 2/32 ms, and so on.

Discontinuous operations (DOs) similar to the NR/LTE Uu DRX mechanism described previously may be applied to an NR SL in order to achieve power saving gain. A joint DO (or a "Discontinuous Transmission and/or Reception (DTRX) operation," which includes at least one of a DRX operation and a Discontinuous Transmission (DTX) operation) between Uu and SL interfaces may be preferred since they allow higher power saving potential. However, the very nature of Uu and SL communication is not the same from the UE's perspective: both ends of an SL communication involve UE. In a Uu communication link, a UE may be involved in only one end. Since Uu activity may be scheduled by a serving BS(s), Uu DRX operations may be applied to determine the DL control channel monitoring behavior of a UE. As an SL communication involves at least one SL Transmission (TX) UE and one SL Reception (RX) UE, it may not be enough to simply define monitoring behavior in SL. For an SL TX UE, there is always a peer SL TX UE. Thus, a straightforward application on Uu DRX timers may not be desirable for achieving a harmonized DO on different radio interfaces (e.g., a Uu interface and an SL interface).

An SL may support two resource allocation modes: resource allocation mode-1 and resource allocation mode-2. For resource allocation mode-1, SL transmission resource(s) is scheduled by a BS. For resource allocation mode-2, SL transmission resource(s) is selected by an SL TX UE. For resource allocation mode-2, SL activity associated with an SL TX UE may not be visible to a BS which provides a cell coverage to the SL TX UE if the SL TX UE is in the cell coverage. Therefore, harmonizing the understanding of the BS and the SL TX UE may be challenging.

Figure 2:
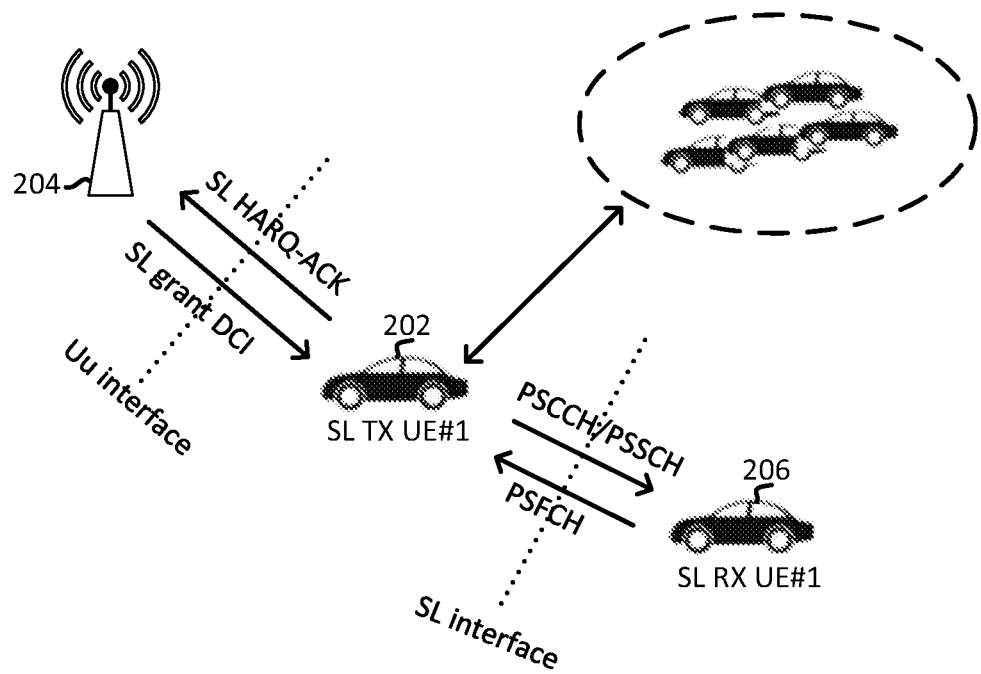
FIG. 2 illustrates communications among devices based on resource allocation mode 1 according to an implementation of the present disclosure.

FIG. 2 illustrates communications among devices based on resource allocation mode-1 according to an implementation of the present disclosure. For resource allocation mode-1, an SL HARQ-Acknowledgement (ACK) (SL HARQ-ACK) over Uu UL may be configured. As illustrated in FIG. 2, one or more SL transmission resources for SL TX UE #1 202 are scheduled by BS 204 via SL Downlink Control Information (DCI). The SL transmission resource(s) may be used for delivery of a Physical Sidelink Control Channel (PSCCH) and its associated Physical Sidelink Shared Channel (PSSCH) to SL RX UE #1 206.

SL RX UE #1 206 may or may not be indicated to transmit an SL HARQ-ACK (and/or an SL HARQ-NACK message), via a Physical Sidelink Feedback Channel (PSFCH) channel on the PC5 interface. SL TX UE #1 202 may or may not be indicated to transmit an SL HARQ-ACK (and/or an SL HARQ-NACK message) via an UL channel on the Uu interface. SL activity may be known to the BS 204 since an SL transmission(s) is preceded by scheduling SL grant DCI. Common understanding on Uu and/or SL activity between BS 204 and at least SL TX UE #1 202 may be feasible. Common understanding on Uu and/or SL activity between BS 204 and SL RX UE #1 206 may also be feasible, if the cast grouping information is available between BS 204 corresponding to SL TX UE #1 202 and a BS corresponding to SL RX UE #1 206. The cast grouping information is scheduling information that is exchanged via an inter-BS connection between multiple BSs. An Uu interface may refer to a radio interface between a UE and a BS that applies a RAT technology such as, but not simply limited to, LTE and/or NR.

In the present disclosure, methods for achieving harmonized DOs between different types of radio interfaces (e.g., Uu and SL interfaces) of a UE for, e.g., power saving purposes are provided.

Uu/SL Joint Discontinuous Operation by Shared Timers

ADO applied jointly to Uu/SL activity may be determined based on at least one of the following timers: an on-duration timer (or "OnDurationTimer timer"), an inactivity timer (or "InactivityTimer timer"), an UL HARQ Round Trip Time (RTT) timer for a TX UE (or "HARQ-RTT-Timer-UL-TX timer"), a DL HARQ RTT timer for a RX UE (or "HARQ-RTT-Timer-DL-RX timer"), an UL retransmission timer for a TX UE (or "RetransmissionTimer-UL-TX timer"), and a DL retransmission timer for an RX UE (or "RetransmissionTimer-DL-RX timer").

The OnDurationTimer timer may define an on-duration of a DO cycle (e.g., a DRX cycle or a DTX cycle). The OnDurationTimer timer may start periodically (e.g., in the beginning of each configured DRX cycle). The OnDurationTimer timer may be a per MAC entity timer. For example, each MAC entity of a UE may be configured with a corresponding OnDurationTimer timer.

In the present disclosure, the correspondence between different radio interfaces and the UE's one or more MAC entities may have various types. For example, different radio interfaces (e.g., SL and Uu interfaces) may correspond to the same MAC entity. In this situation, a per MAC entity timer may refer to a timer to be applied to the radio interfaces corresponding to the MAC entity on which the timer is configured. In one implementation, different radio interfaces (e.g., SL and Uu interfaces) may correspond to different MAC entities. For example, a UE may be configured with MAC entity #1 and MAC entity #2, where MAC entity #1 corresponds to an SL interface and MAC entity #2 corresponds to a Uu interface. In this situation, the UE's behavior on each radio interface may be controlled by a corresponding per MAC entity timer.

The OnDurationTimer timer may start at the beginning of a DO cycle. For example, the OnDurationTimer timer may be started after an offset (e.g., slot offset) from the beginning of the slot of the DO cycle. Whether the OnDurationTimer timer should be started or not may be controlled by a specific indication (e.g., a specific DCI for power saving) from a BS.

The InactivityTimer timer may define an additional active time after a Uu/SL activity is perceived during a DO active time.

An Uu/SL activity may be one of the following activities (1) to (7):

(1) PDCCH monitoring or reception on (E-UTRA/NR) Uu interface.

(2) PSCCH monitoring or reception on (E-UTRA/NR) PC5 interface.

(3) PSCCH transmission on (E-UTRA/NR) PC5 interface.

(4) PSSCH transmission and/or reception on (E-UTRA/NR) PC5 interface.

(5) PSFCH transmission and/or reception on (E-UTRA/NR) PC5 interface.

(6) Physical Sidelink Broadcast Channel (PSBCH) transmission on (E-UTRA/NR) PC5 interface, such as SL-Synchronization Signal Block (SSB) (SL-SSB)/SL-Master Information Block (MIB) (SL-MIB) transmission, if a concerned UE is a sidelink synchronization source which transmit SL SS/PBCH block(s) repeatedly.

(7) SL SS/PBCH block(s) monitor/reception on (E-UTRA/NR) PC5 interface.

The InactivityTimer timer may be a per MAC entity timer. The InactivityTimer timer may start when a Uu or SL activity associated with a corresponding MAC entity is identified. The InactivityTimer timer may be started when Uu and/or SL activity associated with a first transmission of a TB(s) is identified.

One or more Transport Blocks (TBs) may be (re)transmitted across multiple resource reservation periods. For example, the first/initial transmission of the TB(s) may correspond to the first resource reservation period in the multiple resource reservation periods. In another example, the first/initial transmission of the TB(s) may correspond to the first transmission(s) of each of the multiple resource reservation periods.

The InactivityTimer timer may start in the first symbol right after the end of an occasion where a Uu or SL activity happens.

The InactivityTimer timer may start when the resource(s) for an SL activity is provided. For example, the InactivityTimer timer may be started by a UE when the UE receives an SL grant via Uu DCI signaling.

The starting time of the InactivityTimer timer for an SL TX UE and an SL RX UE may be different. For the SL TX UE, the InactivityTimer timer may start when the SL TX UE receives SL grant DCI from the Uu interface. For the SL RX UE, the InactivityTimer timer may start when the SL RX UE receives a PSCCH (and/or PSSCH) associated with SL grant DCI received from the Uu interface.

The HARQ-RTT-Timer-UL-TX timer may define a minimum time duration before a retransmission to be performed or before a retransmission resource grant associated with an earlier Uu and/or SL (re)transmission is received by the Tx UE (e.g., In some implementations, the HARQ-RTT-Timer-UL-TX timer may be defined as the minimum time duration that TX UE expects to receive a SL (re)transmission grant (e.g., from the serving cell) for an earlier SL (re)transmission. On PC5 interface, the TX UE implements the earlier SL (re)transmission and the following SL re-transmission (e.g., via the SL (re)transmission grant, which is received by the TX UE from the serving cell via a DCI) to a target (Layer-2) sidelink destination identity (ID), which is associated with one (or more) target RX UE(s) in one sidelink unicast/groupcast/broadcast group with the TX UE.).

The HARQ-RTT-Timer-UL-TX timer may be a per (sidelink)HARQ process timer. In other words, the HARQ-RTT-Timer-UL-TX timer may be configured per a HARQ process basis. The HARQ-RTT-Timer-UL-TX timer may be associated with a (Sidelink) HARQ Process Number (HPN) or a (sidelink) HARQ process Identifier and may be (re)started when at least one of the following conditions (1) to (5) is satisfied, if the Uu/SL transmission corresponding to the (sidelink) HPN is indicated. The Uu/SL transmission corresponds to a TX UE.

(1) After the end of a Uu UL transmission, where the Uu UL transmission may be a PUSCH transmission, and the Uu UL transmission may be scheduled by a Uu UL DCI transmitted by the serving cell.

(2) After an SL HARQ-ACK transmission from a peer SL RX UE of the corresponding SL transmission is expected/received by the TX UE.

(3) After the end of the SL transmission, where the SL transmission may be PSCCH and/or PSSCH.

(4) After an SL HARQ-ACK feedback from the TX UE to an associated BS via Uu UL is transmitted, where the TX UE may perform the SL transmission corresponding to the indicated HPN (e.g., an SL HPN). The TX UE may receive SL grant DCI, from its Uu interface, scheduling the SL transmission. The SL HARQ-ACK feedback is received from an associated SL RX UE(s) corresponding to the SL transmission.

(5) The exact timing for (re)starting the HARQ-RTT-Timer-UL-TX timer may be at least one of the following (i) to (iv):

(i) At the first symbol after the end of the Uu UL transmission
(ii) At the first symbol after the end of the SL transmission
(iii) At the first symbol after the end of the SL HARQ-ACK transmission from an SL RX UE associated with the SL transmission.
(iv) At the first symbol after the end of an SL HARQ-ACK feedback from the TX UE to the associated BS. The SL HARQ-ACK is associated with the SL transmission.

As described previously, one or more SL transmissions may be indicated by SL grant DCI via a Uu interface. The SL grant DCI may indicate an HPN. The indicated HPN may map to an SL HPN. The indicated HPN and the SL HPN may be associated with the same HARQ-RTT-Timer-UL-TX timer.

The HARQ-RTT-Timer-UL-TX timer may be started if an SL HARQ feedback is enabled/indicated for an SL transmission. The indication may be included in SL control information associated with the SL transmission. The SL HARQ feedback may be an ACK/Negative ACK (NACK), or may be a NACK-only feedback used in a NACK-only mode.

An SL transmission associated with at least one TB may span one or multiple resource reservation periods for (re)transmissions. The ending time of the SL transmission may be determined based on the first transmission. The first transmission may be associated with the first repetition/transmission in a subset of the multiple resource reservation period(s). In one example, the subset includes only the first (e.g., in time domain) resource reservation period. In another example, the first transmission may be associated with the first repetition/transmission in each of the multiple resource reservation period(s).

When the HARQ-RTT-Timer-UL-TX timer expires, the TX UE may start or perform a retransmission to an associated SL RX UE(s), and/or the TX UE may start the RetransmissionTimer-UL-TX timer.

The HARQ-RTT-Timer-DL-RX timer that defines a minimum time duration before a retransmission associated with an earlier Uu and/or SL transmission may be expected/received by an RX UE. The RX UE performs reception to the Uu/SL (re)transmission(s).

The HARQ-RTT-Timer-DL-RX timer may be a per-(SL) HARQ process timer. An HARQ-RTT-Timer-DL-RX timer associated with a (SL) HPN may be (re)started when at least one of the following conditions (1) to (5) are satisfied, if the Uu/SL transmission corresponding to the (SL) HPN is indicated by an associated transmitter (e.g., an SL TX UE).

(1) After the end of a Uu UL transmission carrying the DL HARQ-ACK feedback associated with the Uu reception. The (re)starting time may be the first symbol after the end of the Uu UL transmission.

(2) At the end of the SL reception from the RX UE. The starting time may be the first symbol after the end of the SL reception. The SL reception may receive PSCCH and/or PSSCH (3) After an SL HARQ-ACK transmission of the SL reception from the RX UE in SL. The (re)starting time may be the first symbol after the end of the SL HARQ transmission.

(4) SL HARQ ACK/NACK feedback is indicated by e.g., SL control information.

(5) SL HARQ NACK-only feedback is indicated by e.g., SL control information.

The Uu/SL reception corresponding to the Uu/SL transmission(s) may be performed by a RX UE(s) on the Uu/SL interface. The SL transmission(s) may be associated with an SL TX UE. The SL TX UE may indicate the (SL) HPN via SL control information.

The HARQ-RTT-Timer-DL-RX timer may be (re)started. The (re)start of the HARQ-RTT-Timer-DL-RX timer may require an SL decoding result associated with an SL reception that is not successfully decoded.

The HARQ-RTT-Timer-DL-RX timer may not be (re)started if one of the following is met, if the HARQ-RTT-Timer-DL-RX timer is associated with an SL reception.

(1) SL HARQ feedback is disabled by e.g., SL control information.

(2) SL NACK-only HARQ feedback may be indicated and the SL decoding result associated with the SL reception is successful.

The SL transmission from the SL TX UE may involve one or multiple (re)transmissions. The (re)transmissions may span one or multiple resource reservation period(s). The ending time of SL reception may be determined based on the first transmission. The first transmission may be associated with the first repetition/transmission in a subset of the multiple resource reservation period(s). In one example, the subset may include only the first (e.g., in time domain) resource reservation period. In another example, the first transmission may be associated with the first repetition/transmission in each of the multiple resource reservation period(s).

The RetransmissionTimer-UL-TX timer may define the maximum time duration until a retransmission associated with an earlier Uu and/or SL transmission is performed or a retransmission resource associated with the earlier Uu and/or SL transmission is provided (e.g., the RetransmissionTimer-UL-TX timer may be defined as the maximum time duration that a retransmission resource grant associated with an earlier SL (re)transmission would be received by the UE. In some implementations, the UE may receive the retransmission resource grant associated with an earlier SL (re)transmission from serving cell via a DCI on the Uu interface and then the UE may implement SL re-transmission for the earlier SL (re)transmission of one associated SL destination (e.g., the SL destination ID associated with one (or more) target RX UE(s) in one SL unicast/groupcast/broadcast group) via the received retransmission resource grant).

The RetransmissionTimer-UL-TX timer may be a per (SL) HARQ process timer. The RetransmissionTimer-UL-TX timer may be associated with a (SL) HPN, and may be (re)started when at least one of the following conditions (1) and (4) are satisfied, if the Uu/SL transmission corresponding to the (SL) HPN is indicated. The Uu/SL transmission may correspond to a TX UE.

(1) When the HARQ-RTT-Timer-UL-TX timer associated with the RetransmissionTimer-UL-TX timer expires. In some implementations, the HARQ-RTT-Timer-UL-TX timer and the RetransmissionTimer-UL-TX timer may be associated with the same SL HARQ process Identifier of one SL destination ID (configured in the TX UE side). In addition, in some implementations, each SL HARQ process Identifier of each SL destination ID may be configured independently in the TX UE side.

(2) When an earliest PSFCH associated with a latest SL (re)transmission of the (SL) HPN is expected/received.

(3) If subsequent retransmission for a TB associated with the latest SL (re)transmission of the HPN is indicated e.g., by a higher layer (e.g., RRC layer or above) or by SL control information associated with the latest (re)transmission, the RetransmissionTimer-UL-TX timer may (re)start at the end of each of the (re)transmission (e.g., for each of the SL re-transmission associated with the same SL HARQ Identifier (or SL HPN) of RetransmissionTimer-UL-TX timer in the TX UE side). The starting of the retransmission timer may further require that HARQ feedback is disabled for, e.g., the (SL) HPN.

(4) The RetransmissionTimer-UL-TX timer may be started with an (timing) offset after a new transmission is performed.

The SL transmission(s) may be indicated by SL grant DCI in a Uu interface. The SL grant DCI may indicate the (SL) HPN on the Uu interface of the TX UE side. The indicated HPN may map to an SL HPN on the PC5 interface of the TX/RX UE side. The indicated HPN and the SL HPN may be associated with the same HARQ-RTT-Timer-UL-TX timer and/or RetransmissionTimer-UL-TX timer.

The RetransmissionTimer-UL-TX timer may be stopped when the HARQ-RTT-Timer-UL-TX timer associated with the same (SL) HPN is running (or when the HARQ-RTT-Timer-UL-TX timer associated with the same HPN starts running), and/or when a grant for SL retransmission is received by the TX UE (from the serving cell), and/or when an HARQ-ACK feedback for the same (SL) HPN is received. While the RetransmissionTimer-UL-TX timer is running (or while the RetransmissionTimer-UL-TX timer starts to run), the TX UE may perform retransmission(s) to an associated receiver(s). While the RetransmissionTimer-UL-TX timer stops running, the TX UE may not perform retransmission(s) to the RX UE The RetransmissionTimer-DL-RX timer may define the maximum time duration until a retransmission associated with an earlier Uu and/or SL transmission is expected/received by a RX UE. The RX UE performs reception to the Uu/SL (re)transmission(s).

The RetransmissionTimer-DL-RX timer may be a per-(SL) HARQ process timer. A RetransmissionTimer-DL-RX timer associated with a (SL) HPN, and may be (re)started when at least one of the following conditions (1) to (4) is satisfied, if the Uu/SL transmission corresponding to the (SL) HPN is indicated by an associated transmitter (e.g., the TX UE (which may be associated with one SL destination ID) with the same SL unicast/group-cast/broadcast group with the RX UE).

(1) When its associated HARQ-RTT-Timer-DL-TX timer expires and/or the Uu/SL decoding results associated with a latest Uu/SL reception of the (SL) HPN is not successful.

(2) When the earliest PSFCH associated with a latest SL reception of the (SL) HPN is expected/transmitted.

(3) If subsequent retransmission (on PC5 interface) for a TB associated with the latest SL reception of the (SL) HPN is indicated e.g., by SL control information associated with the latest SL reception, the RetransmissionTimer-DL-RX timer may be (re-)started at the end of each of the reception. The starting of the RetransmissionTimer-DL-RX timer may further require that (SL) HARQ feedback is disabled for, e.g., the (SL) HPN.

(4) The RetransmissionTimer-DL-RX timer may be stopped when HARQ-RTT-Timer-DL-RX associated with the (SL) HPN is running.

The Uu/SL reception corresponding to the Uu/SL transmission may be performed by the RX UE in its Uu/SL. The SL transmission(s) is associated with an SL TX UE. The SL TX UE may indicate the (SL) HPN via SL control information to the SL RX UE. In some implementations, The SL TX UE and the SL RX UE may be grouped in the same SL unicast/group-cast/broadcast group by the upper layers (e.g., via the PC5-S protocols). In some additional implementations, the SL-TX UE and the SL-RX UE may be configured with one active PC5-RRC connection (e.g., via the PC5-S protocols) between each other (e.g., within one SL unicast group). So, the SL TX UE and the SL RX UE may exchange/configure the proposed SL DRX configurations/parameters (which may be applied on Uu interface/PC5 interface) via the suggested PC5-RRC connection.

A DRX command MAC Control Element (CE) that is similar to the MAC CE applied on a Uu interface defined in, e.g., 3 GPP TS38.321 V16.1.0 may be applied. When receiving the DRX command MAC CE, the OnDuration-Timer timer and the InactivityTimer timer may be stopped. In one example, the DRX command MAC CE may stop the OnDurationTimer timer(s) and the InactivityTimer(s) that are corresponding to all MAC entities (e.g., all the MAC entities corresponding to Uu interface and PC5 interface) of the UE. In another example, there are individual DRX command MAC CEs for controlling individual MAC entities of the UE. For example, when receiving a DRX command MAC CE corresponding to a MAC entity, the UE may stop the timers (e.g., the OnDurationTimer timer and the InactivityTimer timer) corresponding to the MAC entity. In one example, if a common OnDurationTimer timer is used for both of the Uu MAC entity (i.e., the MAC entity corresponding to the Uu interface) and the SL MAC entity (i.e., the MAC entity corresponding to the SL interface) whereas multiple individual InactivityTimer timers are respectively used for the Uu MAC entity and the SL MAC entity (if different interfaces are configured with different MAC entities respectively), the DRX command MAC CE corresponding SL MAC entity may stop the OnDuration-Timer timer and the SL InactivityTimer timer.

The per-(SL) HARQ process timers described previously may apply different timer values when applied for Uu or for SL transmission/reception. The per-(SL) HARQ process timer may refer to a HARQ-RTT-Timer-UL-TX timer, a HARQ-RTT-Timer-DL-RX timer, a RetransmissionTimer-UL-TX timer, or a RetransmissionTimer-DL-RX timer. The HARQ processes may be divided into one or more groups. In one implementation, the timer values configured for different groups may be provided independently and may be different from each other. For example, there may be 2 groups of HARQ processes: one group may be for Uu transmission/reception and the other group for SL transmission/reception. Such grouping may be applicable to all or a subset of the per-(SL) HARQ process timers described previously. In another implementation, multiple timer values configured for the per-(SL) HARQ process timer(s) may be provided. For a UE, which timer value to be applied may depend on the type of the transmission/traffic. For example, two sets of values may be provided for the per-(SL) HARQ process timers: one set for Uu transmission/reception and the other set for SL transmission/reception. A UE may decide which set of timer values should be applied for a concerned (SL) HPN, based on Radio Network Temporary Identifier (RNTI) type. For DCI received by a UE, if the scrambling RNTI of the DCI is related to Uu interface, the set related to a Uu transmission/reception may be applied. If the scrambling RNTI of the DCI is related to an SL interface (e.g., an SL RNTI), the set related to SL transmission/reception may be applied. For an SL RX UE, the set related to SL transmission/reception may be applied. Alternatively, a UE may decide which set of timer values should be applied for a concerned (SL) HPN, based on which channel that the transmission/reception occurs. For example, if the UE performs transmission/reception on a Uu-related channel (e.g., a PDCCH, a Physical Downlink Shared Channel (PDSCH), or a Physical Uplink Shared Channel (PUSCH)), the set related to Uu transmission/reception may be applied. On the other hand, the UE performs transmission/reception on an SL-related channel (e.g., a PSCCH, a PSSCH, or a PSFCH), the set related to SL transmission/reception may be applied.

For a UE of concern, when a DO for a Uu/SL activity is configured and/or activated, it is either in active time or in OFF time in one (SL) DRX cycle. The UE may be in active time at least when one of the following timers is running: the onDuration-Timer timer, the InactivityTimer timer, the RetransmissionTimer-UL-TX timer (e.g., the Retransmis-sionTimer-UL-TX timer associated with all of the active/running HARQ process in the TX UE side), and the RetransmissionTimer-DL-RX timer (e.g., the RetransmissionTimer-DL-RX timer associated with all of the active/running HARQ process in the TX UE side). The active time may be additionally caused by pending a scheduling request procedure or a contention based random access procedure or a (SL) buffer status report to the serving cell. The active time may further include the cases when a Scheduling Request is sent on a Physical Uplink Control Channel (PUCCH) and is pending, and/or when a PDCCH indicating a new transmission addressed to the Cell-RNTI (C-RNTI) of the MAC entity has not been received after successful reception of a Random Access Response for the Random Access Preamble not selected by the MAC entity among the contention-based Random Access Preamble. Otherwise, the SL UE may be in an OFF time (or OFF period in one (SL) DRX cycle). During the SL DO active time, the UE may be required to monitor/receive or transmit at least one of the following channels (1) to (4):

(1) PDCCH.
(2) PSCCH and/or PSSCH.
(3) PSCCH and/or PSFCH.
(4) PSBCH.

An SL activity due to receiving a PSCCH and/or a PSSCH may not extend the Uu interface active time. An SL RX UE receiving PSCCH/PSSCH with a corresponding (SL) HPN may trigger a corresponding timer behavior. However, the SL RX UE may not extend the active time for PDCCH monitoring on a Uu interface simply due to a running RetransmissionTimer-DL-RX timer stared due to reception of PSCCH/PSSCH. In one implementation, there may be an interface-specific prohibitor, e.g., a parameter denoted as "Prohibit Uu," that prevents the SL RX UE from extending its active time for PDCCH monitoring. The Prohibit Uu may be in a prohibited-state and the Uu interface may not be monitored by the SL RX UE, even the SL RX UE is in the active time. In this case, the active time may be applicable only to a PC5 interface for the SL RX UE.

Uu/SL Partially Joint Discontinuous Operation by Individual Timers

A DO applied partially jointly to a Uu/SL activity may be determined based on the at least one of the following timers: the InactivityTimer timer, the HARQ-RTT-Timer-UL-TX_Uu timer, the HARQ-RTT-Timer-DL-RX_Uu timer, the RetransmissionTimer-UL-TX_Uu timer, and the RetransmissionTimer-DL-RX_Uu timer.

The inactivity Timer timer that defines an additional active time after a Uu/SL activity is perceived during a DO active time. The InactivityTimer timer may be shared by Uu and SL interface. In other words, there may be no SL-specific InactivityTimer configured for DRX operations in the Uu interface while the SL activity is jointly considered on the Uu interface and so the original InactivityTimer timer on the Uu interface may be reused. In some other implementations, the InactivityTimer timer may be interface specific. For example, an InactivityTimer timer specific to an Uu interface may be an InactivityTimer-Uu timer; an InactivityTimer timer specific to an SL interface may be an InactivityTimer-SL timer. In some implementations, one UE (e.g., a SL TX UE or a SL RX UE) may be configured with NR Uu interface and either (NR/E-UTRA) PC5 interface jointly. In some other implementations, one UE may be configured with E-UTRA Uu interface and either (NR-E-UTRA) PC5 interface jointly. So, the proposed (SL) DRX mechanisms, DRX alignment mechanisms, and parameters would be applied to these (but not be limited by) scenarios.

In one implementation, an interface-specific inactivity timer may start when a transmission/reception activity associated with the corresponding interface of a MAC entity of a UE is identified by the UE. In one implementation, an interface-specific inactivity timer and an InactivityTimer timer may not exist at the same time. In one implementation, an interface-specific inactivity timer may operate similarly as the InactivityTimer timer described previously, with a difference in that each of the interface-specific inactivity timer only responds to transmission/reception taken place in the corresponding interface (e.g., either (NR/E-UTRA) PC5 interface or (NR/E-UTRA) Uu interface). In one implementation, the InactivityTimer-SL timer may react to a Uu transmission/reception if the Uu transmission/reception is associated with Uu DCI scrambled by an SL-related RNTI, e.g., an SL RNTI, SL Configured Scheduled Radio Network Temporary Identifier (SLCS-RNTI), aSL Semi-Persistent Scheduling Vehicle-Radio Network Temporary Identifier (e.g., SL-SPS-V-RNTI), or a Vehicle-RNTI (V-RNTI).

The additional active time as a result of an interface-specific inactivity timer may be only applicable for its corresponding interface. For a UE, the active time for different interfaces may be different. Denote a set of (SL) HARQ process numbers used for transmission/reception of one interface, Interface_i, by S_HARQ_Interface_i. Interface_i may be one of {Uu, SL}. The Interface_i may be in active time when one of the following timers (1) to (4) is running:

(1) onDuration-Timer.
(2) an InactivityTimer_Interface_i, which is the inactivity timer associated with Interface_i.
(3) RetransmissionTimer-UL-TX_Interface_i, which includes retransmission timer(s) associated with (SL) HARQ process set S_HARQ_Interface_i, for (re)transmission activity.
(4) RetransmissionTimer-DL-RX Interface_i, which includes retransmission timer(s) associated with (SL) HARQ process set S_HARQ_Interface_i, for reception activity.

In one implementation, the HARQ-RTT-Timer-UL-TX_Uu timer may only respond to Uu interface. The HARQ-RTT-Timer-UL-TX_SL timer may only respond to an SL activity (e.g., SL activity corresponds to one active SL HARQ process in the TX UE side). The HARQ-RTT-Timer-UL-TX timer may not co-exist with a HARQ-RTT-Timer-UL-TX_Uu timer and a HARQ-RTT-Timer-UL-TX_SL timer. In one implementation, the HARQ-RTT-Timer-UL-TX_SL may react to a Uu transmission/reception if the Uu transmission/reception is associated with Uu DCI scrambled by an SL related RNTI, e.g., SL RNTI, SLCS-RNTI, SL-SPS-V-RNTI, or V-RNTI.

In one implementation, the HARQ-RTT-Timer-DL-RX_Uu may only respond to a Uu activity. In one implementation, the HARQ-RTT-Timer-DL-RX_SL may only respond to an SL activity (e.g., SL activity corresponds to one active SL HARQ process in the RX UE side). In one implementation, the HARQ-RTT-Timer-DL-RX may not co-exist with a HARQ-RTT-Timer-DL-RX_Uu timer and a HARQ-RTT-Timer-DL-RX_SL timer.

In one implementation, HARQ-RTT-Timer-DL-RX_SL timer may react to a Uu transmission/reception if the Uu transmission/reception is associated with Uu DCI scrambled by an SL related RNTI, e.g., SL RNTI, SLCS-RNTI, SL-SPS-V-RNTI, or V-RNTI.

In one implementation, the RetransmissionTimer-UL-TX_Uu timer may only respond to a Uu activity. In one implementation, the RetransmissionTimer-UL-TX_SL timer may only respond to an SL activity (e.g., SL activity corresponds to one active SL HARQ process in the TX UE side). In one implementation, the RetransmissionTimer-UL-TX timer may not co-exist with a RetransmissionTimer-UL-TX_Uu timer and a RetransmissionTimer-UL-TX_SL timer.

In one implementation, the RetransmissionTimer-UL-TX_SL may react to a Uu transmission/reception if the Uu transmission/reception is associated with Uu DCI scrambled by an SL related RNTI, e.g., SL RNTI, SLCS-RNTI, SL-SPS-V-RNTI, or V-RNTI.

In one implementation, the RetransmissionTimer-DL-RX_Uu timer may only respond to a Uu activity. In one implementation, the RetransmissionTimer-DL-RX_SL timer may only respond to an SL activity (e.g., SL activity corresponds to one active SL HARQ process in the TX UE side). In one implementation, the RetransmissionTimer-DL-RX timer may not co-exist with a RetransmissionTimer-DL-RX_Uu timer and a RetransmissionTimer-DL-RX_SL timer.

In one implementation, the RetransmissionTimer-DL-RX_SL timer may react to a Uu transmission/reception if the Uu transmission/reception is associated with Uu DCI scrambled by an SL related RNTI, e.g., SL RNTI, SLCS-RNTI, SL-SPS-V-RNTI, or V-RNTI.

In one implementation, the active time for a Uu and SL interface may be determined based on the above-described timers separately. For example, the Uu interface active time may be determined based on the onDuration-Timer timer, the InactivityTimer timer, and the RetransmissionTimer-UL-TX_Uu and Retransmission-DL-RX_Uu timers that are corresponding to the (SL) HPNs associated with the Uu transmission/reception. The SL interface active time may be determined based on the onDuration-Timer timer, the InactivityTimer timer, and the RetransmissionTimer-UL-TX_SL and Retransmission-DL-RX_SL timers that are corresponding to the (SL) HPNs associated with the SL transmission/reception.

The per-(SL) HARQ process timers described previously may be configured with interface-specific timer values. The per HARQ process timer may be one of the following timers: a HARQ-RTT-Timer-UL-TX_Interface_i timer, a HARQ-RTT-Timer-DL-RX Interface_i timer, a RetransmissionTimer-UL-TX_Interface_i timer, and a Retransmission-Timer-DL-RX Interface_i timer.

Figure 3:
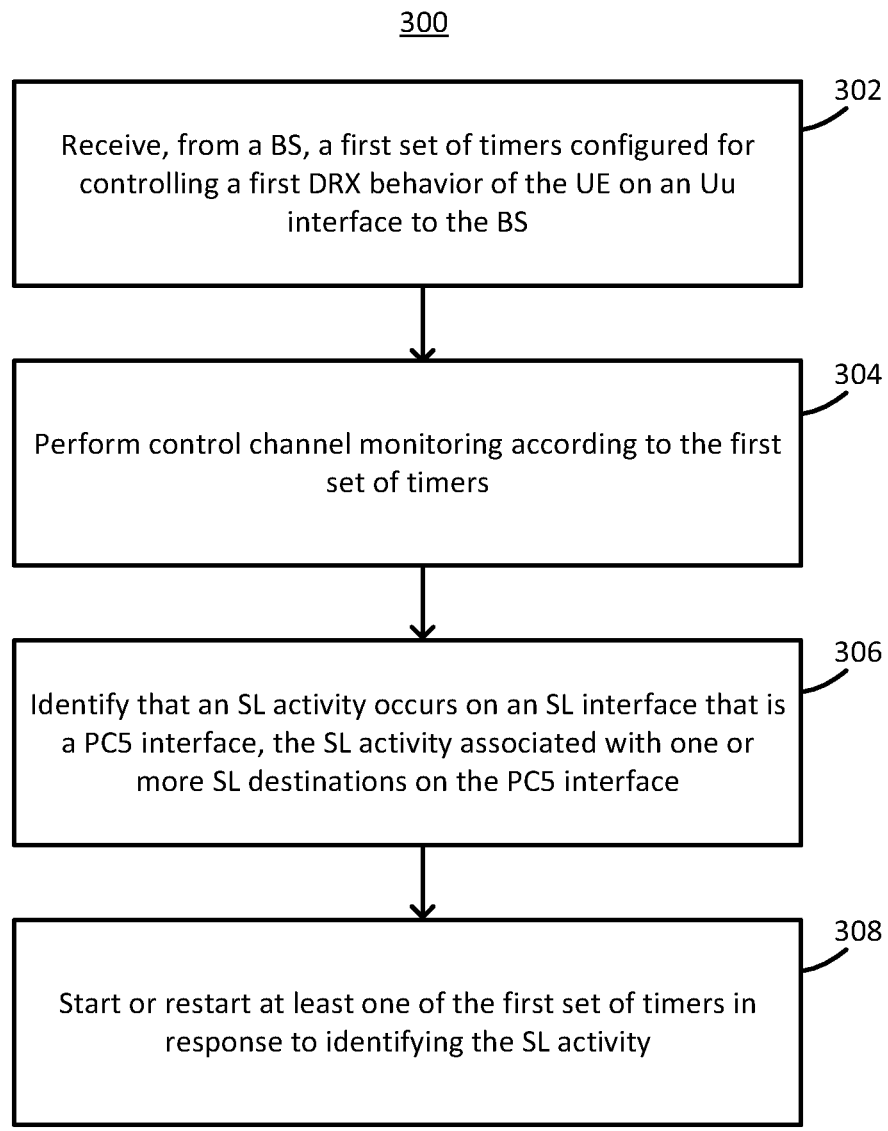
FIG. 3 illustrates a flowchart for a method performed by a UE for controlling DRX behavior on multiple radio interfaces, according to an implementation of the present disclosure.

FIG. 3 illustrates a flowchart for a method 300 performed by a UE for controlling DRX behavior on multiple radio interfaces, according to an implementation of the present disclosure. Although actions 302, 304, 306 and 308 are illustrated as separate actions represented as independent blocks in FIG. 3, these separately illustrated actions should not be construed as necessarily order dependent. The order in which the actions are performed in FIG. 3 is not intended to be construed as a limitation, and any number of the disclosed blocks may be combined in any order to implement the method, or an alternate method. Moreover, each of actions 302, 304, 306 and 308 may be performed independent of other actions, and can be omitted in some implementations of the present disclosure.

In action 302, the UE may receive, from a BS (e.g., via broadcasting system information or UE-specific DL RRC signaling), a first set of timers configured for controlling a first DRX behavior of the UE on an Uu interface to the BS.

The first set of timers may include at least one per MAC entity timer and/or at least one per-(SL) HARQ process timer. For example, the first set of timers may be an entire set of, or a subset of, the following timers: an onDurationTimer timer, an InactivityTimer-Uu timer, a HARQ-RTT-Timer-UL-TX_Uu timer, a RetransmissionTimer-UL-TX_Uu timer, a HARQ-RTT-Timer-DL-RX_Uu timer, and a RetransmissionTimer-DL-RX_Uu timer, which are described previously.

In action 304, the UE may perform control channel monitoring according to the first set of timers. For example, the UE may monitor the control channel(s) (e.g., PDCCH) on the Uu interface in the (DRX) active time determined based on the first set of timers.

In action 306, the UE may identify that an SL activity occurs on an SL interface. The SL interface may be a PC5 interface. The SL activity may be associated with one or more SL destinations (e.g., SL TX/RX UE(s)) on the PC5 interface. The SL activity may include monitoring or transmitting, by the UE, an SL signal to the one or more SL destinations on the PC5 interface. For example, the SL activity may include at least one of the following:

PSCCH monitoring or reception,
PSCCH transmission,
PSSCH transmission and/or reception,
PSFCH transmission and/or reception,
PSBCH transmission, such as SL-SSB/SL-MIB transmission, if the UE is a synchronization source which transmit SL SS/PBCH block(s) repeatedly, and
SL SS/PBCH block(s) monitor/reception.

In action 308, the UE may start or restart at least one of the first set of timers in response to identifying the SL activity. For example, the UE may start or restart a DRX inactivity timer (e.g., an InactivityTimer-Uu timer) in the first set of timers.

In one implementation, the UE may further receive, from the BS through RRC signaling, an indication that a resource allocation mode-1 is applied. For resource allocation mode-1, SL transmission resource(s) is scheduled by the BS (e.g., via DCI through PDCCH(s)).

With the method 300, a harmonized DO on different radio interfaces (e.g., a Uu interface and an SL interface) is achieved since a set of timers which is preconfigured for a radio interface (e.g., Uu interface) also reacts to the activity(ies) on another radio interface (e.g., an SL activity).

In one implementation, the UE may further use the first set of timers to control a DTRX behavior/operation of the UE on the SL interface. In other words, the UE may use a single set of timers to control the DO on different radio interfaces. In one implementation, the DTRX behavior/operation of the UE on the SL interface may be partially controlled by the first set of timers, and the remaining DTRX behavior/operation which is not controlled by the first set of timers is controlled by a second set of timers, as illustrated in FIG. 4.

Figure 4:
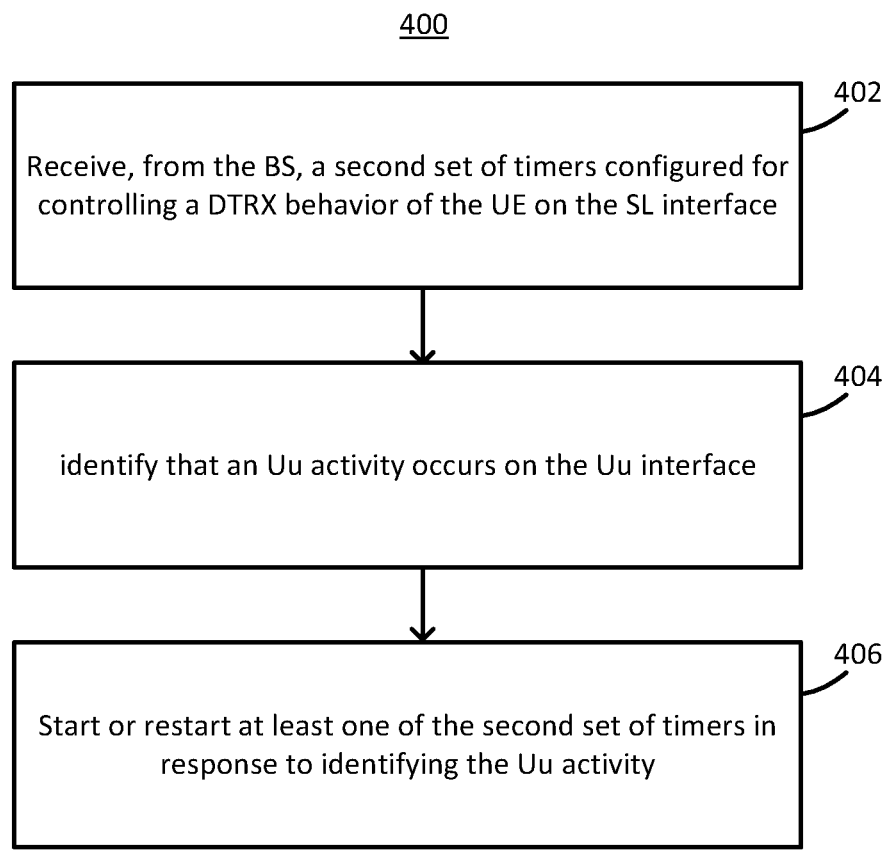
FIG. 4 illustrates a flowchart for a method performed by a UE for controlling DRX behavior on multiple radio interfaces, according to an implementation of the present disclosure.

FIG. 4 illustrates a flowchart for a method 400 performed by a UE for controlling (SL) DRX behavior on multiple radio interfaces, according to an implementation of the present disclosure. Although actions 402, 404 and 406 are illustrated as separate actions represented as independent blocks in FIG. 4, these separately illustrated actions should not be construed as necessarily order dependent. The order in which the actions are performed in FIG. 4 is not intended to be construed as a limitation, and any number of the disclosed blocks may be combined in any order to implement the method, or an alternate method. Moreover, each of actions 402, 404 and 406 may be performed independent of other actions, and can be omitted in some implementations of the present disclosure. The method 400 may be performed independent of, or in combination with, the method 300 illustrated in FIG. 3.

In action 402, the UE may receive, from the BS (e.g., via broadcasting system information or UE-specific DL RRC signaling), a second set of timers configured for controlling a DTRX behavior of the UE on the SL interface. In some implementations, the UE may receive the first set of timers and/or the second set of timers via broadcasting system information (e.g., via System Information Block (SIB) 12 for common (cell-specific) NR SL configuration to support NR SL communication service) or UE-specific DL RRC signaling (e.g., via one or more DL RRC signaling with the information element 'SL-ConfigDedicatedNR', which is configured to support NR sidelink communication service). In some other implementations, the UE may receive the first set of timers and/or the second set of timers via broadcasting system information (e.g., via SIB 13/SIB14 for common (cell-specific) E-UTRA V2X SL configuration to support E-UTRA V2X SL communication service) or UE-specific DL RRC signaling (e.g., via one or more DL RRC signaling with the information element 'SL-ConfigDedicatedEUTRA', which is configured to support E-UTRA V2X sidelink communication service). Please also note, in some implementations, the UE (e.g., SL TX/RX UE) may obtain the proposed parameters SL pre-configuration, which may be pre-installed in the memory module of the UE side or be configured by the serving network in the previous CN/RAN connection.

Compared to the first set of timers described in the method 300, the second set of timers is a separate set of timers. The first set of timers and the second set of timers may be individually configured by the BS (e.g., via broadcasting system information or UE-specific DL RRC signaling). The second set of timers may include at least one per MAC entity timer and/or at least one per-(SL) HARQ process timer. For example, the second set of timers may be an entire set of, or a subset of, the following timers: an onDurationTimer timer, an InactivityTimer-SL timer, a HARQ-RTT-Timer-UL-TX_SL timer, a RetransmissionTimer-UL-TX_SL timer, a HARQ-RTT-Timer-DL-RX_SL timer, and a RetransmissionTimer-DL-RX_SL timer, which are described previously.

In one implementation, the second set of timers may include at least one timer configured in a per SL HARQ process basis (i.e., per-(SL) HARQ process timer) associated with one of the one or more SL destinations on the PC5 interface, and the first set of timers described in the method 300 may include a duplicate of the at least one timer included in the second set of timers. For example, the first set of timers may include the following timers: an onDurationTimer timer, an InactivityTimer-Uu timer, a HARQ-RTT-Timer-UL-TX_Uu timer, a RetransmissionTimer-UL-TX_Uu timer, a HARQ-RTT-Timer-DL-RX_Uu timer, a RetransmissionTimer-DL-RX_Uu timer, a HARQ-RTT-Timer-UL-TX_SL timer, a RetransmissionTimer-UL-TX_SL timer, a HARQ-RTT-Timer-DL-RX_SL timer, and a RetransmissionTimer-DL-RX_SL timer, where last four timers (i.e., the HARQ-RTT-Timer-UL-TX_SL timer, the RetransmissionTimer-UL-TX_SL timer, the HARQ-RTT-Timer-DL-RX_SL timer, and the RetransmissionTimer-DL- RX_SL timer) are the duplicate of the per-(SL) HARQ process timers of the second set of timers.

In action 404, the UE may identify that an Uu activity occurs on the Uu interface. For example, the Uu activity may include monitoring, by the UE, one or more PDCCH(s) from the BS (PDCCH monitoring or reception) or from the serving cell, which is configured by the serving BS to serve at least one UE for DL/UL packet exchange and SL operation.

In action 406, the UE may start or restart at least one of the second set of timers in response to identifying the Uu activity. In other words, the second set of timers which is preconfigured for the SL interface may also react to the activity(ies) on another radio interface (e.g., a Uu activity).

As described previously, each of the first set of timers and the second set of timers may include a corresponding DRX on-duration timer (e.g., onDurationTimer timer). Assuming the DRX on-duration timer in the first set of timers is a first DRX on-duration timer and the DRX on-duration timer in the second set of timers is a second DRX on-duration timer, the first DRX on-duration timer and the second DRX on-duration timer have the same timer value.

The following may be used to further disclose terms, examples, embodiments, implementations, actions, and/or behavior:

HARQ: A functionality may ensure delivery between peer entities at Layer 1 (i.e., Physical Layer). A single HARQ process may support one Transport Block (TB) when the physical layer is not configured for downlink/uplink spatial multiplexing, and when the physical layer is configured for downlink/uplink spatial multiplexing, a single HARQ process may support one or multiple TBs. There may be one HARQ entity per serving cell. Each HARQ entity may support a parallel (number) of DL and UL HARQ process. HARQ may be implemented on Uu interface (for the DL/UL packet exchange between the UE and the serving cell/BS) or PC5 interface (e.g., SL HARQ protocol, which is configured for the SL packet exchange between one SL TX UE and one or more SL RX UE(s) in one SL unicast/group-cast/broadcast group).

Timer: A MAC entity may set up one or more timers for individual purposes, for example, triggering some uplink signaling retransmission or limiting some uplink signaling retransmission period. A timer may be running once it is started, until it is stopped or until it expires; otherwise, it may not be running. A timer may be started if it is not running or restarted if it is running. A Timer may be started or restarted from its initial value. In some examples, the initial value may be configured by the gNB via downlink RRC signaling.

BWP: A subset of the total cell bandwidth of a cell may be referred to as a Bandwidth Part (BWP) and beamwidth part adaptation may be achieved by configuring the UE with BWP(s) and telling the UE which of the configured BWPs is currently the active one. To enable Bandwidth Adaptation (BA) on the PCell, the gNB may configure the UE with UL and DL BWP(s). To enable BA on Secondary Cells (SCells) in case of CA, the gNB may configure the UE with DL BWP(s) at least (e.g., there may be none in the UL). For the PCell, the initial BWP may be the BWP used for initial access. For the SCell(s), the initial BWP may be the BWP configured for the UE to first operate at SCell activation. The UE may be configured with a first active uplink BWP by a firstActiveUplinkBWP IE. If the first active uplink BWP is configured for an SpCell, the firstActiveUplinkBWP IE field may contain the ID of the UL BWP to be activated upon performing the RRC (re)configuration. If the field is absent, the RRC (re)configuration may not impose a BWP switch. If the first active uplink BWP is configured for an S Cell, thefirstActiveUplinkBWP IE field may contain the ID of the uplink bandwidth part to be used upon MAC-activation of an SCell. In some implementations, the BS proposed timers/parameters may be associated with one specific UL-BWP (or SL BWP) configuration. In some additional implementations, each UL-BWP/SL-BWP may be configured with different values for DRX/SL-DRX operations.

Figure 5:
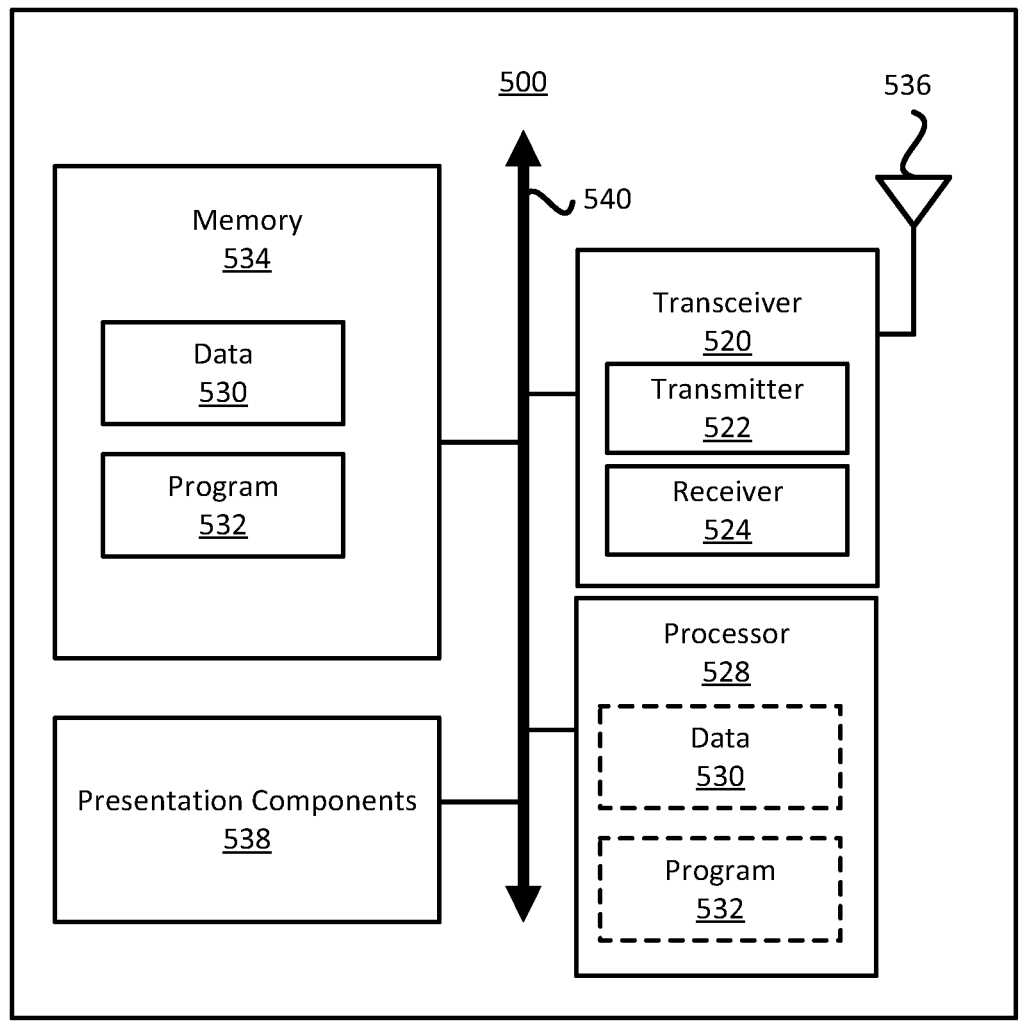
FIG. 5 is a block diagram illustrating a node for wireless communication according to an implementation of the present disclosure.

FIG. 5 is a block diagram illustrating a node 500 for wireless communication according to an implementation of the present disclosure. As illustrated in FIG. 5, a node 500 may include a transceiver 520, a processor 528, a memory 534, one or more presentation components 538, and at least one antenna 536. The node 500 may also include a radio frequency (RF) spectrum band module, a BS communications module, a network communications module, and a system communications management module, Input/Output (I/O) ports, I/O components, and a power supply (not illustrated in FIG. 5).

Each of the components may directly or indirectly communicate with each other over one or more buses 540. The node 500 may be a UE or a BS that performs various functions disclosed with reference to FIGS. 1 through 4.

The transceiver 520 has a transmitter 522 (e.g., transmitting/transmission circuitry) and a receiver 524 (e.g., receiving/reception circuitry) and may be configured to transmit and/or receive time and/or frequency resource partitioning information. The transceiver 520 may be configured to transmit in different types of subframes and slots including but not limited to usable, non-usable and flexibly usable subframes and slot formats. The transceiver 520 may be configured to receive data and control channels.

The node 500 may include a variety of computer-readable media. Computer-readable media may be any available media that may be accessed by the node 500 and include volatile (and/or non-volatile) media and removable (and/or non-removable) media.

The computer-readable media may include computer-storage media and communication media. Computer-storage media may include both volatile (and/or non-volatile media), and removable (and/or non-removable) media implemented in any method or technology for storage of information such as computer-readable instructions, data structures, program modules or data.

Computer-storage media may include RAM, ROM, EPROM, EEPROM, flash memory (or other memory technology), CD-ROM, Digital Versatile Disks (DVD) (or other optical disk storage), magnetic cassettes, magnetic tape, magnetic disk storage (or other magnetic storage devices), etc. Computer-storage media may not include a propagated data signal. Communication media may typically embody computer-readable instructions, data structures, program modules or other data in a modulated data signal such as a carrier wave or other transport mechanisms and include any information delivery media.

The term "modulated data signal" may mean a signal that has one or more of its characteristics set or changed in such a manner as to encode information in the signal. Communication media may include wired media such as a wired network or direct-wired connection, and wireless media such as acoustic, RF, infrared and other wireless media. Combinations of any of the previously listed components should also be included within the scope of computer-readable media.

The memory 534 may include computer-storage media in the form of volatile and/or non-volatile memory. The memory 534 may be removable, non-removable, or a combination thereof. Example memory may include solid-state memory, hard drives, optical-disc drives, etc. As illustrated in FIG. 5, the memory 534 may store a computer-readable and/or computer-executable program 532 (e.g., software codes or a set of instructions) that are configured to, when executed, cause the processor 528 to perform various functions disclosed herein, for example, with reference to FIGS. 1 through 4. Alternatively, the program 532 may not be directly executable by the processor 528 but may be configured to cause the node 500 (e.g., when compiled and executed) to perform various functions disclosed herein.

The processor 528 (e.g., having processing circuitry) may include an intelligent hardware device, e.g., a Central Processing Unit (CPU), a microcontroller, an ASIC, etc. The processor 528 may include memory. The processor 528 may process the data 530 and the program 532 received from the memory 534, and information transmitted and received via the transceiver 520, the base band communications module, and/or the network communications module. The processor 528 may also process information to send to the transceiver 520 for transmission via the antenna 536 to the network communications module for transmission to a CN.

One or more presentation components 538 may present data indications to a person or another device. Examples of presentation components 538 may include a display device, a speaker, a printing component, a vibrating component, etc.

In view of the present disclosure, it is obvious that various techniques may be used for implementing the disclosed concepts without departing from the scope of those concepts. Moreover, while the concepts have been disclosed with specific reference to certain implementations, a person of ordinary skill in the art may recognize that changes may be made in form and detail without departing from the scope of those concepts. As such, the disclosed implementations are considered in all respects as illustrative and not restrictive. It should also be understood that the present disclosure is not limited to the specific implementations disclosed. Still, many rearrangements, modifications, and substitutions are possible without departing from the scope of the present disclosure.

What is claimed is:

1. A method performed by a User Equipment (UE) for controlling Discontinuous Reception (DRX) behavior on multiple radio interfaces, the method comprising:
   receiving, from a Base Station (BS), a first set of timers configured for controlling a first DRX behavior of the UE on a Uu interface;
   performing control channel monitoring according to the first set of timers;
   identifying that a Sidelink (SL) activity has occurred on an SL interface that is a PC5 interface, the SL activity associated with one or more SL destinations on the PC5 interface;
   starting or restarting at least one of the first set of timers in response to identifying the occurrence of the SL activity;
   receiving, from the BS, a second set of timers configured for controlling a Discontinuous Transmission and/or Reception (DTRX) behavior of the UE on the SL interface;
   identifying that a Uu activity has occurred on the Uu interface; and
   starting or restarting at least one of the second set of timers in response to identifying the occurrence of the Uu activity.

2. The method according to claim 1, further comprising: using the first set of timers to control the DTRX behavior of the UE on the SL interface.

3. The method according to claim 1, wherein:
   the Uu activity includes monitoring, by the UE, a Physical Downlink Control Channel (PDCCH) received from the BS, and
   the SL activity includes monitoring or transmitting, by the UE, an SL signal to the one or more SL destinations on the PC5 interface.

4. The method according to claim 1, wherein:
   the second set of timers includes at least one timer configured on a per SL Hybrid Automatic Repeat Request (HARD) process basis associated with one of the one or more SL destinations on the PC5 interface, and
   the first set of timers includes a duplicate of the at least one timer included in the second set of timers that is configured on the per SL HARQ process basis.

5. The method according to claim 1, wherein:
   the first set of timers includes a first DRX on-duration timer,
   the second set of timers includes a second DRX on-duration timer, and
   the first DRX on-duration timer and the second DRX on-duration timer have a same timer value.

6. The method according to claim 1, wherein the first set of timers and the second set of timers are individually configured by the BS.

7. The method according to claim 1, wherein the at least one of the first set of timers started or restarted by the UE includes a DRX inactivity timer.

8. The method according to claim 1, further comprising:
   receiving, from the BS through Radio Resource Control (RRC) signaling, an indication that a resource allocation mode-1 is applied.

9. A User Equipment (UE) for controlling Discontinuous Reception (DRX) behavior on multiple radio interfaces, the UE comprising:
   transceiver circuitry;
   at least one processor; and
   at least one memory coupled to the at least one processor, the at least one memory storing a set of computer-executable instructions that, when executed by the at least one processor, causes the UE to:
   use the transceiver circuitry to receive, from a Base Station (BS), a first set of timers configured for controlling a first DRX behavior of the UE on a Uu interface;
   control the transceiver circuitry to perform control channel monitoring according to the first set of timers;
   identify that a Sidelink (SL) activity has occurred on an SL interface that is a PC5 interface, the SL activity associated with one or more SL destinations on the PC5 interface;
   start or restart at least one of the first set of timers in response to identifying the occurrence of the SL activity;
   use the transceiver circuitry to receive, from the BS, a second set of timers configured for controlling a Discontinuous Transmission and/or Reception (DTRX) behavior of the UE on the SL interface;
   identify that a Uu activity has occurred on the Uu interface; and
   start or restarting at least one of the second set of timers in response to identifying the occurrence of the Uu activity.

10. The UE according to claim 9, wherein the set of computer-executable instructions, when executed by the at least one processor, further causes the UE to:
use the first set of timers to control the DTRX behavior of the UE on the SL interface.

11. The UE according to claim 9, wherein:
the Uu activity includes the UE monitoring a Physical Downlink Control Channel (PDCCH) received from the BS, and
the SL activity includes monitoring or transmitting an SL signal to the one or more SL destinations on the PC5 interface.

12. The UE according to claim 9, wherein:
the second set of timers includes at least one timer configured on a per SL Hybrid Automatic Repeat Request (HARD) process basis associated with one of the one or more SL destinations on the PC5 interface, and
the first set of timers includes a duplicate of the at least one timer included in the second set of timers that is configured on the per SL HARQ basis.

13. The UE according to claim 9, wherein:
the first set of timers includes a first DRX on-duration timer,
the second set of timers includes a second DRX on-duration timer, and
the first DRX on-duration timer and the second DRX on-duration timer have a same timer value.

14. The UE according to claim 9, wherein the first set of timers and the second set of timers are individually configured by the BS.

15. The UE according to claim 9, wherein the at least one of the first set of timers started or restarted by the UE includes a DRX inactivity timer.

16. The UE according to claim 9, wherein the set of computer-executable instructions, when executed by the at least one processor, further causes the UE to:
use the transceiver circuitry to receive, from the BS through Radio Resource Control (RRC) signaling, an indication that a resource allocation mode-1 is applied.

* * * * *